United States Patent Office 3,452,786
Patented July 1, 1969

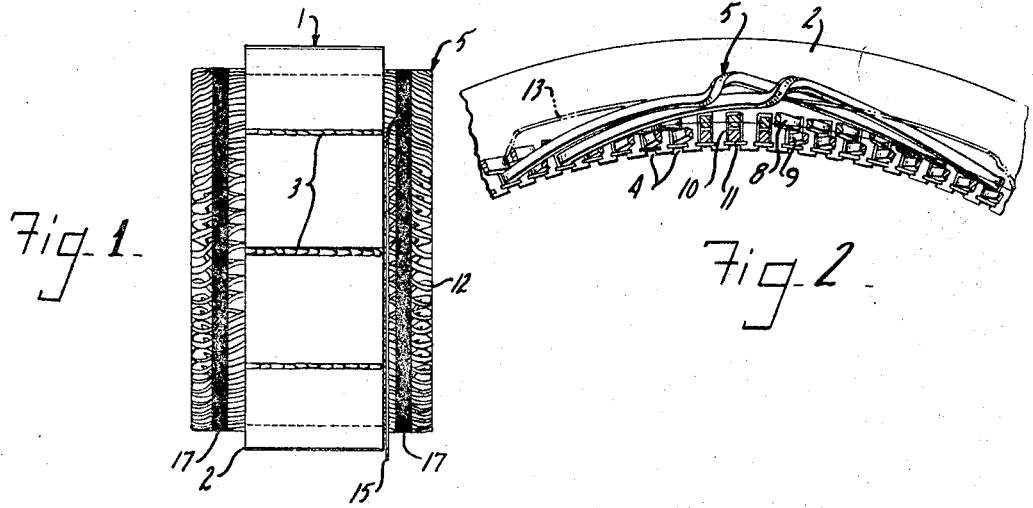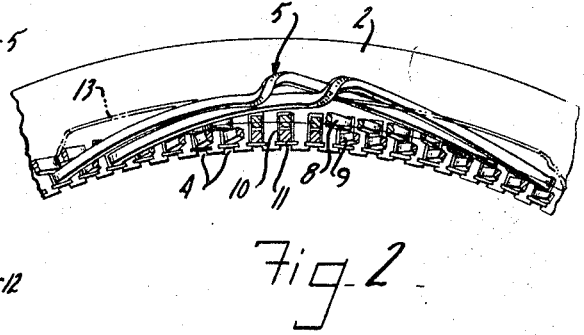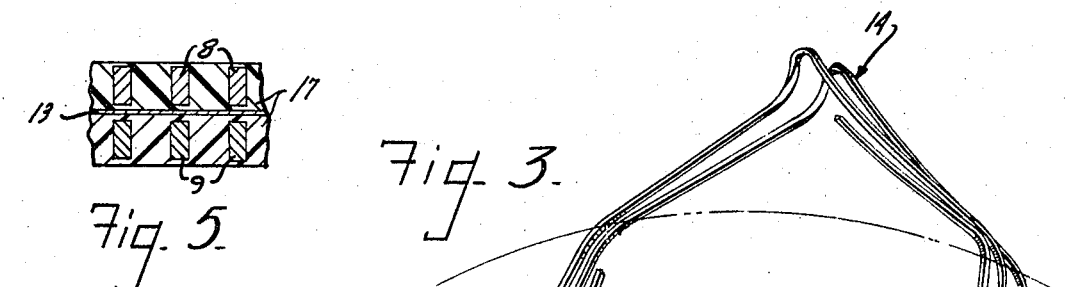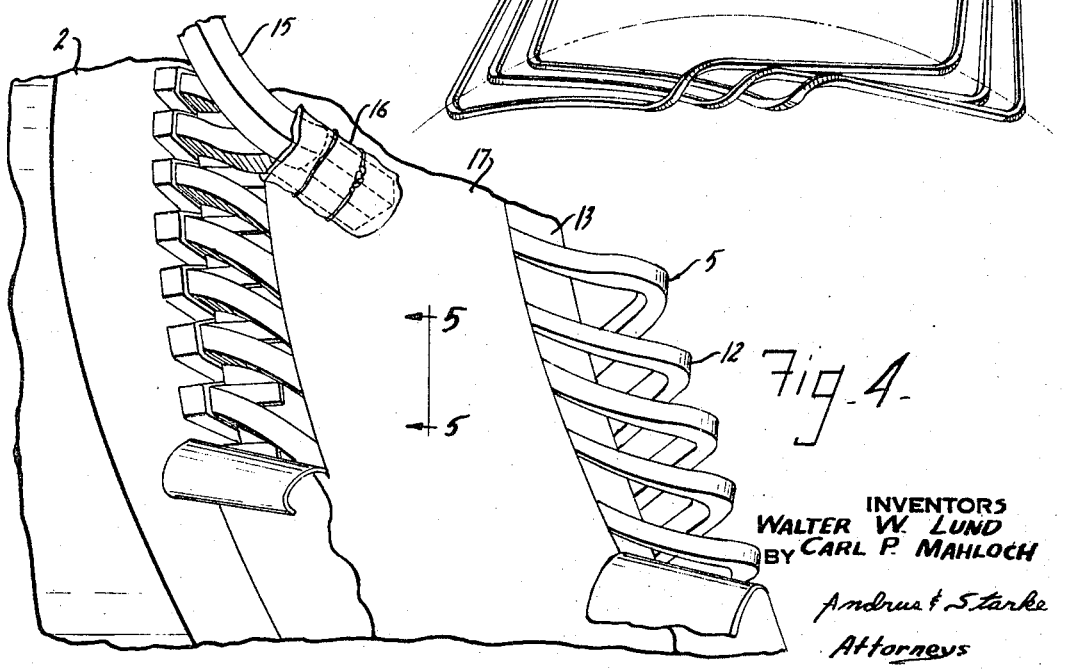
INVENTORS
WALTER W. LUND
CARL P. MAHLOCH
BY Andrus & Starke
Attorneys

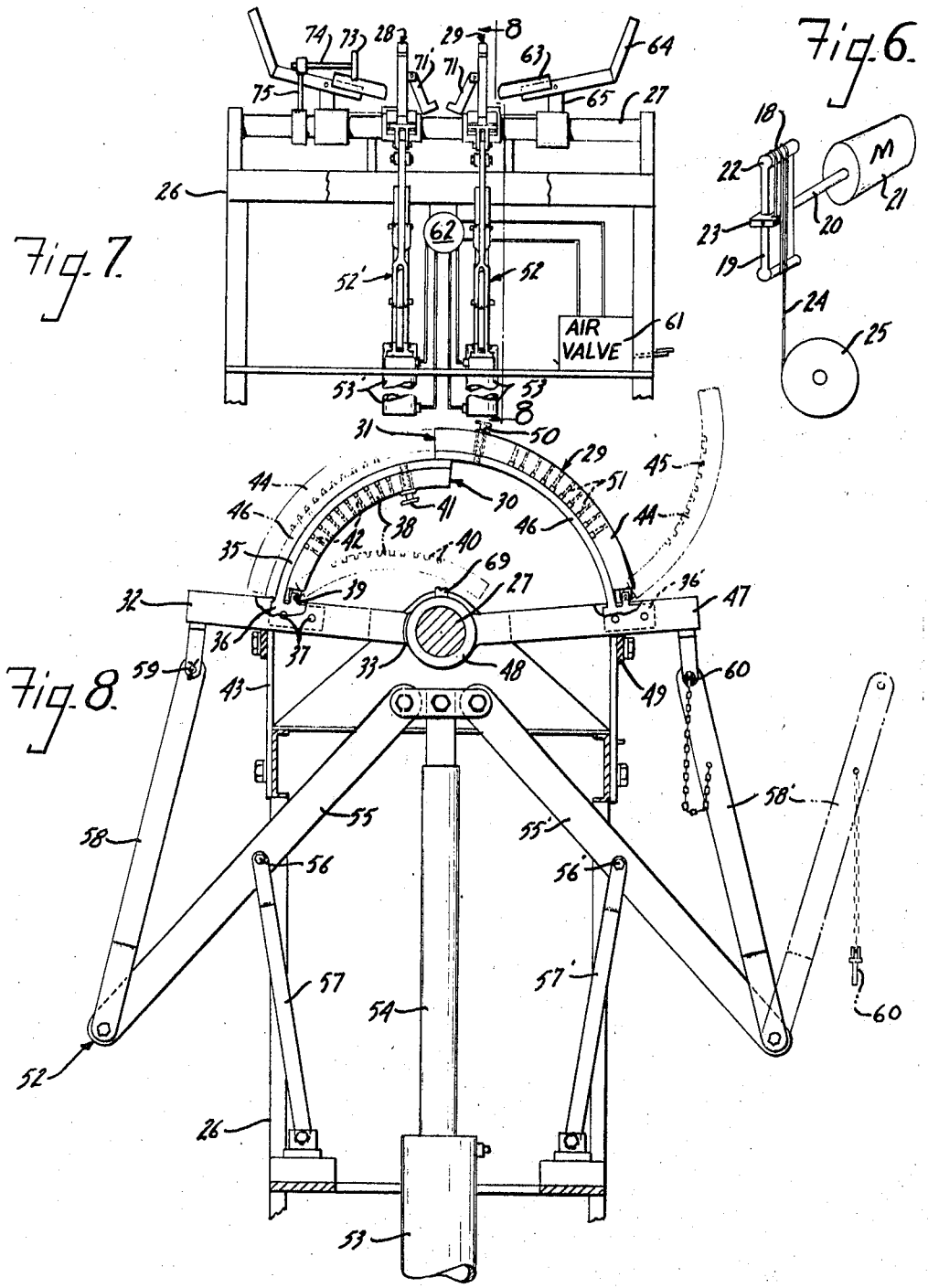

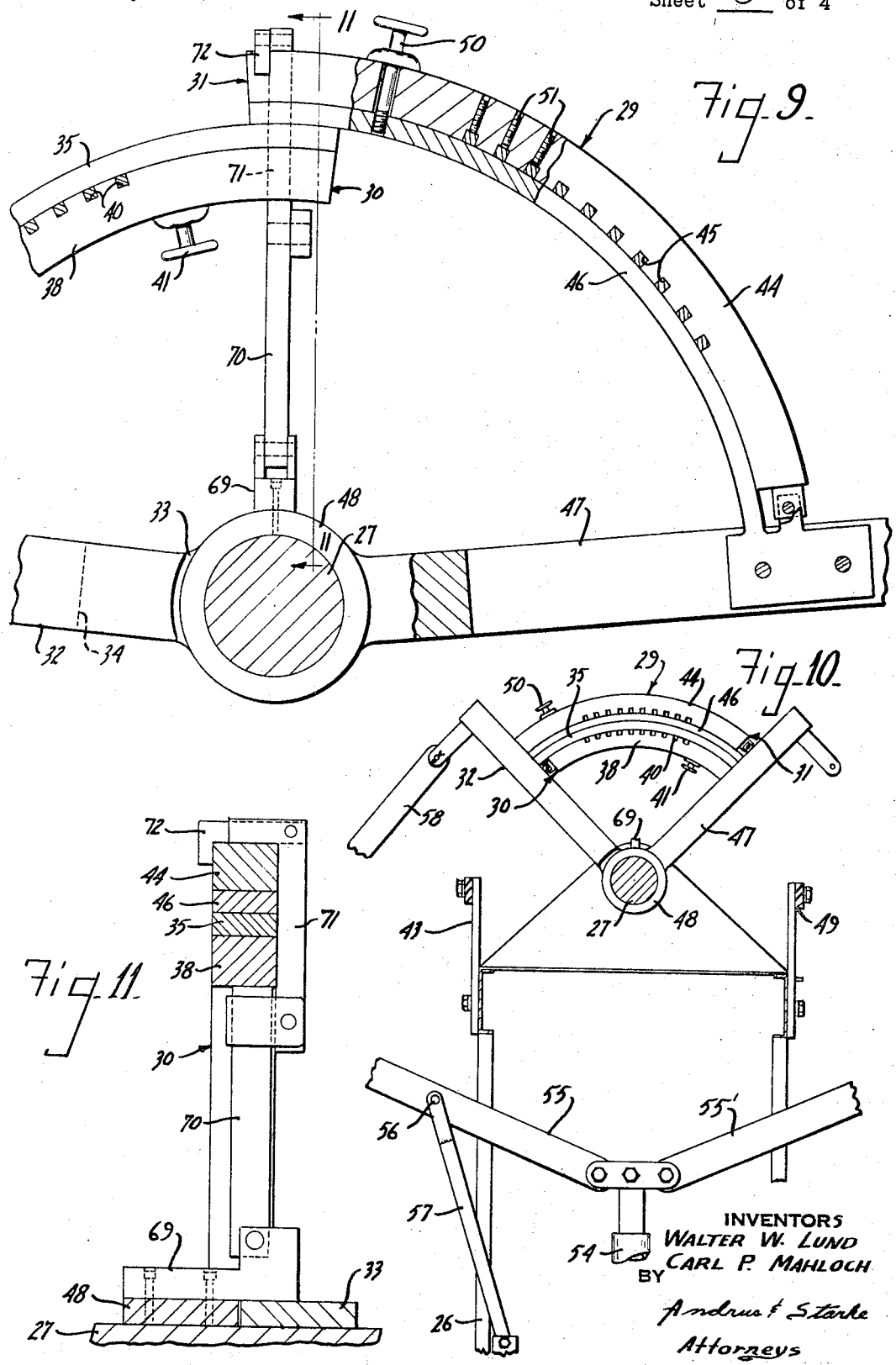

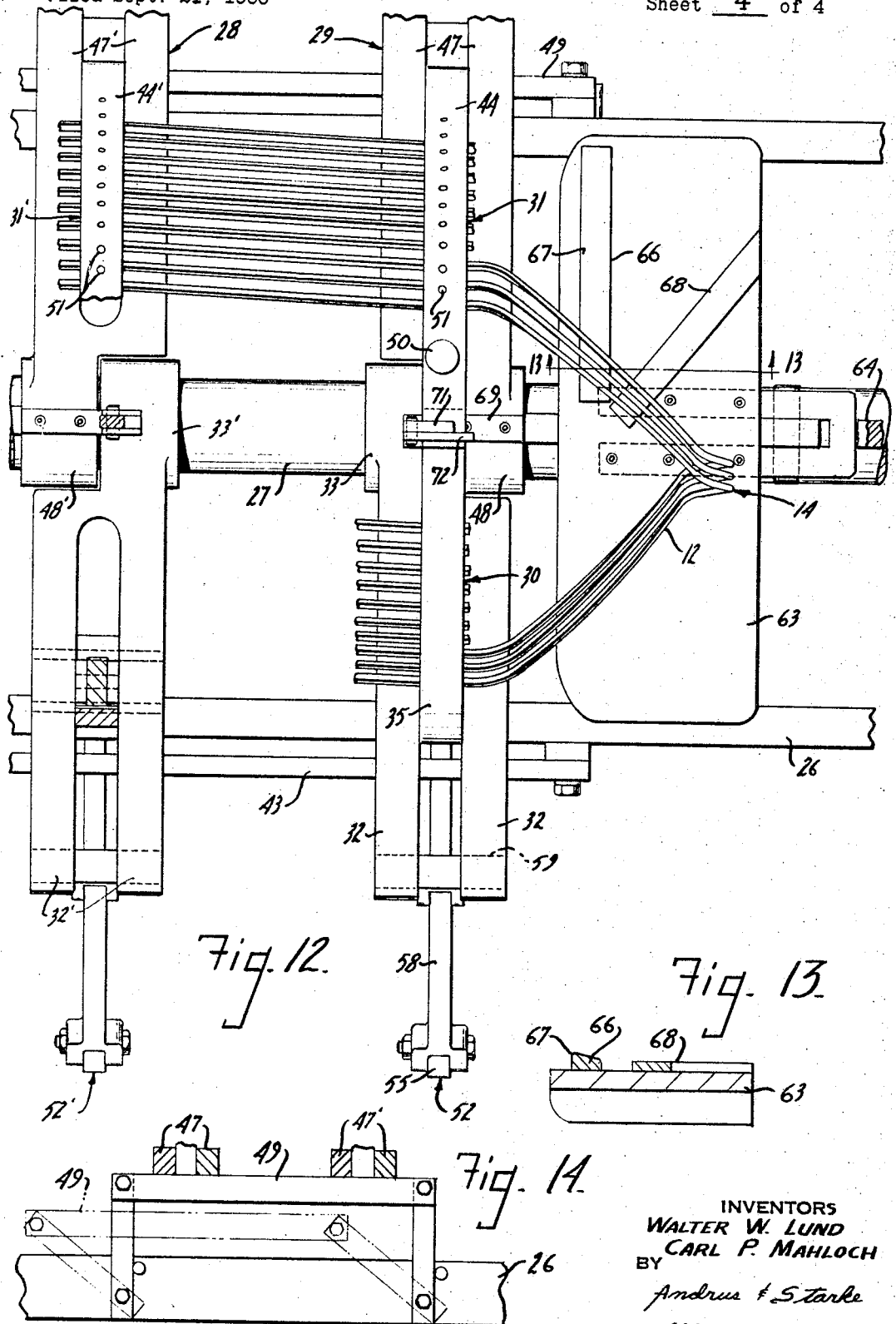

3,452,786
APPARATUS FOR FORMING A WINDING
Walter W. Lund and Carl Peter Mahloch, Appleton, Wis., assignors to Kurz and Root Company, Inc., Appleton, Wis., a corporation of Wisconsin
Filed Sept. 21, 1966, Ser. No. 581,001
Int. Cl. B21f 3/00
U.S. Cl. 140—92.1                    16 Claims

ABSTRACT OF THE DISCLOSURE

The present disclosure is related to a mechanism for pulling and forming a multiple turn coil of a continuous conductor. Two pairs of pivotally mounted and telescopically arranged segmental arms are provided and are spaced in accordance with the length of the core. The arms having locking notches to hold each side of each coil turn at preselected spaced points such that pivoting of the arms of each pair in opposite directions pulls the coil sides to the final curvature with the outer restrained ends spread and twisted in a compound knuckle. A radial deforming force is applied on the outer turns immediately inwardly of the knuckle to proivde the normal outer flared end spacing.

---

This invention relates to apparatus for forming a winding to be inserted in an annular magnetic core such as the annular stator core for alternators, synchronous motors and the like which have a relatively high rating.

Alternators, synchronous motors and the like may be constructed with an annular stator within which a rotating field is rotatably mounted. The stator construction particularly for larger rated alternators and the like includes an annular magnetic core having circumferentially distributed and axially extended stator slots. The winding consists of coils spanning the distance of a pole pitch and interconnected together to form groups in accordance with the phase connection; for example, a three-phase winding. Each coil includes a multiple number of turns with adjacent turns being disposed in adjacent slots. The coils may be disposed in the slots with two sides per coil per stator slot. Each turn may be a plurality of series connected conductors of a realtively small diameter to provide the desired current carrying capacity. Alternatively, separate single coil turns are provided and disposed within the stator slots and after assembly within the stator slots are brazed to the adjacent turns to provide the desired series connection. Generally, the outer ends of the coil turns are secured to a supporting end ring.

Although highly satisfactory stator units can be constructed in this manner, the assembly is time consuming and requires skilled personnel. Thus, in making the brazed connection between the turns care must be taken not to damage the adjacent core as a result of the heating. Further, in such devices, the brazed connections are a possible fault location and a possible source of heat loss which reduce the efficiency.

The interconnection of the several coil turns to the outer physical ring is also a relatively time consuming process which adds appreciably to the cost.

A highly improved magnetic core structure and the method of forming the same is the subject matter of a copending application Ser. No. 581,002 filed concurrently therewith, of Walter W. Lund entitled Electromagnetic Structure and Method of Making the Same which is filed on the same date as this application and is assigned to the same assignee. Generally, as disclosed therein, the several turns of a winding group are formed as a continuous integral conductor without brazed or other separate connections.

The windings are preferably formed by winding a continuous conductor into a multiple number of adjacent turns. While holding the portion of the coil adapted to mate with the stator slot against axial movement and allowing the outer ends to remain essentially unrestrained, relatively angular movement is established between the upper sides of each turn and the lower sides of each turn to displace the turn sides in accordance with the slot spacing. It has been found that by moving of the sides as a group relative to each other along an arc generally corresponding to that of the core structure, the outer ends automatically provide the desired forming and spacing. The outer ends can then be bent outwardly to produce the desired end flare of the coil group for subsequent assembly with the stator core.

The present invention is particularly directed to a highly satisfactory and novel mechanism for pulling and forming the novel windings. Generally, the mechanism includes two pairs of pivotally mounted segmental arms each of which generally forms a segment of a circle corresponding to the circumference of the inner slot location and outer slot location for the windings. The arms are spaced in accordance with the length of the core and are pivotally mounted at the outer ends such that the larger diameter arm can be telescoped with the other arm of the pair. Each of the arms is provided with suitable notches to receive the end portions of the coil turns which are to be disposed within the ends of the stator slots. After assembly of the unformed coil with the telescoped arms, the arms of each pair are similarly pivoted in opposite directions to provide an equal and opposite pull on the upper sides relative to the lower sides of each turn. The outer ends being unrestrained automatically spread and twist in a compound turn and establish spacing therebetween with the sides spread to correspond to the location of the stator slots.

After spreading the outer ends are preferably formed outwardly to provide the normal outer flared spacing. It has been found that by exerting a radial deforming force on the outer turns immediately inwardly of the knuckle, the inner turns automatically follow.

While clamped in the arms, the coil sides can be marked or scored to provide a locating means for assembly in the stator.

The upward force applied on the coil has a tendency to deflect the telescoped arm members and a releasable latch means is preferably applied to hold the free ends of the arms against such bending forces.

Thus the present invention provides a novel apparatus for forming of coil groups into a plurality of properly spaced coils.

The drawings furnished herewith illustrate a preferred construction of the present invention in which the above advantages and features are clearly described and shown as well as others which will be clear from the following description.

In the drawings;

FIG. 1 is a side elevational view of an alternator stator unit constructed in accordance with the present invention;

FIG. 2 is an enlarged fragmentary end view of the stator unit with parts broken away and sectioned to more clearly show details of the invention;

FIG. 3 is an enlarged fragmentary pictorial view of the end portion of the stator unit;

FIG. 4 is a perspective view of a portion of a coil winding shown in FIGS. 1 and 2;

FIG. 5 is an enlarged section taken generally on lines 5—5 of FIG. 4;

FIG. 6 is a pictorial view of an apparatus for initial formation of a winding for subsequent formation into the configuration of FIG. 3;

FIG. 7 is a side elevational view of a coil pulling and stretching machine for forming of the winding as shown in FIG. 4;

FIG. 8 is an enlarged vertical section taken generally on line 8—8 of FIG. 7;

FIG. 9 is an enlarged fragmentary view more clearly showing details of the apparatus shown in FIG. 8;

FIG. 10 is a view similar to FIG. 8 showing the apparatus positioned just prior to a pulling or stretching operation;

FIG. 11 is a view taken on line 11—11 of FIG. 9;

FIG. 12 is an enlarged fragmentary plan view of the apparatus shown in FIG. 7;

FIG. 13 is a view taken on line 13—13 of FIG. 12; and

FIG. 14 is a fragmentary view showing a part of the apparatus.

Referring to the drawings and particularly to FIG. 1, a stator unit 1 for an alternator of a rotating field type is illustrated constructed in accordance with the teaching of the previously identified copending application. A suitable housing and rotor assembly, not shown, are assembled with the stator unit 1 in accordance with any known or desired design. Generally, the stator unit 1 includes an annular core 2 formed of a plurality of laminations interconnected and held together by a series of circumferentially distributed peripheral welds 3. A plurality of circumferentially distributed slots 4 are formed on the inner face of the annular core 2 within which a stator winding 5 is disposed. For purposes of discussion, it will be assumed that the stator winding 5 is a distributed three-phase winding and that there are several slots 4 per phase per pole and two coil sides per slot. The coils occupying corresponding slots under the poles, not shown, would be series connected to form a phase winding. Thus, each slot 4 includes an inner conductor 8 of one coil or turn of a phase winding coil group and an outer conductor 9 forming the side of another coil or turn of the other phase winding coil group, in accordance with known design. The coil turns are shown insulated from the core by slot liners 10. The slots are closed by slot pegs 11 which are driven in from the ends of the slots into suitable recesses formed in the side walls of the slots immediately adjacent the opening thereto. Insulating strips or pegs may be interposed between the coil sides in each of the slots. Each coil spans a full or partial pole with the coil sides connected by similar end extensions 12 which are specially constructed in this invention. An interphase insulation paper 13 is interposed between the inner coil sides and the outer coil sides in the end extensions 12.

Each coil group is formed as a continuous integral conductor particularly having integral continuous end extensions, as most clearly shown in FIGS. 2–4. In FIGS. 2 and 3, only two complete coils or turns are shown as a coil group 14 for purposes of clarity. In actual practice, a greater number of turns complete a coil group. Each turn is continuous with the next turn and are preformed with the coil sides circumferentially and radially spaced in accordance with the designed full or short pole pitch.

A plurality of the coil groups 14 are preformed, a preferable method and apparatus being hereinafter described and then assembled within the slots 4 of the stator core 2 with the flared outer end extensions 12 projecting generally axially of the core 2. The ends of the coil groups 14 are silver soldered to appropriate ends of the related spaced groups or to interconnecting leads 15 in accordance with the particular design. The soldered connections may be covered with suitable insulating sleeve 16 in accordance with general design considerations.

Further, during the assembly of the coil groups 14 to the stator core 4, the interphase insulating paper strips 13 are inserted or interleaved between the upper and lower sides of the turns to form a continuous loop of insulation.

The end extensions 12 are supported by a mass of plastic or similar material 17 which can be applied in paste form and set to a rigid mass. The material 17 forms the sole support for the extensions 12 without interfering with the cooling of the winding. This provides an exceptionally inexpensive support for the winding while maintaining operating characteristics.

In the illustrated embodiment of the invention, the supporting material spans an intermediate portion of the outer turn extensions with the outermost extremities being free of any such material. This provides highly satisfactory cooling of the winding while maintaining the coil turns in fixed spaced relation to prevent short circuiting therebetween without the necessity of the usual end supporting ring.

The space between the extensions of each turn or coil is exxtremely important to prevent voltage breakdown and consequently it is very important that the end turns be held in spaced and preferably consistently spaced relation. Further, such support must be maintained over long periods of time associated with the normal long life of alternators and the like. Applicant has found that the present invention provides an unusually satisfactory answer to the economical and reliable support of the winding.

The supporting material further acts as a guard reducing the danger associated with dirt falling in between the coil turns and thus provides a long term insulation.

After application and setting of the epoxy resin or other suitable supporting material, the stator unit is dipped and baked in the conventional manner.

A highly satisfactory and novel apparatus for preforming the coil groups such as shown in FIG. 3 particularly forms the subject matter of the present invention and a preferred construction is shown in FIGS. 6–11 and described as follows.

An elongated unformed spiral coil group 18 is first formed with each coil or turn having a peripheral length corresponding to that of each coil in the final group. A simple and practical apparatus is shown in FIG. 6. A rotating plate-like arm 19 includes a center drive 20 connected to a rotating drive means 21. The outer end of the arms are rounded or enlarged as at 22 to define a diameter spacing of the inner and outer sides of each coil. A conductor clamp 23 is secured to the arm and is adapted to fixedly secure an end of a continuous conductor to the arm 19. A conductor 24 corresponding to the conductor of the stator winding is stored as a continuous conductor on a spool 25 or the like. The end of conductor 24 is secured to the arm 19 which is then rotated to wind the conductor thereon in a plurality of adjacent spiral coils or turns to form the unformed coil group 18 with the desired number of turns. The unformed coil group is severed from spool 25 and then removed from the winding machine and placed in a coil pulling and forming apparatus shown in FIGS. 7 and 11.

Generally, the illustrated embodiment of the pulling and forming machine is symmetrical about a vertical plane through FIG. 7 to similarly form the opposite ends or halves of the coil group and consequently the one half of the machine will be described in detail with the corresponding elements of the other half identified by similar primed numbers for simplicity and clarity of explanation.

Generally, the illustrated mechanism includes an open supporting framework 26 having a pivot support shaft 27 secured to the upper end of the open frame. A pair of similar pulling and stretching units 28 and 29 are secured to the shaft 27 and spaced axially from each other in accordance with the axial length of the core 2. Each unit includes a lower stretch arm assembly 30 and an upper stretch arm assembly 31 pivotally secured to the opposite sides of shaft 27 and adapted to grasp the group 18 of continuous coils immediately adjacent the portion of the coils mating with the one end of the slots 4 and by opposite pivotal movement of the coil to the configuration of FIG. 3.

More particularly, the lower stretch arm assembly 30 includes a pivot lever 32 having a hub 33 pivotally mounted on the shaft 27. The outer end of the lever 32 is bifurcated as at 34. A curved clamping plate or strip 35 of a suitable metal or the like includes an integral end mounting block 36 disposed between the arms of the bifurcated end 34 and secured therein by suitable attachment bolts 37. In the outwardly pivoted position of lever 32 the plate 35 extends upwardly and inwardly terminating over the shaft 27. A curved clamping arm 38 is pivotally secured to mounting lip 39 on the block 36 and includes a plurality of circumferentially distributed notches 40 in the top surface thereof. The notches 40 have a cross section corresponding to that of the conductor 24 and are spaced in accordance with the slots 4 in the stator core 2. A clamping bolt 41 extends through the opposite or outer free end of the clamp arm 38 and threads into the strip 35 to releasably interconnect them. The unformed coil group 18 of FIG. 6 is assembled over the strip 35 and the lower or the inner slot sides disposed within the notches 40. When the strip 35 is clamped to the arm 38 it holds the coil sides in the several notches 40.

Set screws 42 are provided in the back side of the curved arm 38 in alignment with each of the notches 40. After assembly of the coil sides, the set screws 42 are turned inwardly to tightly clamp the coil sides in the assembled relation to arm assembly 30. This provides a means to positively hold the conductor between the pulling units against axially related movement during the stretching and forming operations hereinafter described, while leaving the end extension of the unformed coil group 18 free to move.

The curved arm 38 of assembly 28 and the related curved arm 38' of the related assembly 29 to the opposite side of the pulling apparatus are spaced such that the outer end surfaces of the arms are essentially located in accordance with the length of the stator core 2. Consequently, by tightly clamping the unformed coil symmetrically located in the arms 38 and 38', the intermediate portion of the coils of the coil group 18 are held in a predetermined parallel relation corresponding to the location of the stator slots 4.

The stator slots 4 may be provided with a slight skew. A corresponding positioning of the coil sides is readily established by having the notches 40 and 40' in arms 38 and 38' offset radially in accordance with the skew angle.

A suitable support plate 43 is secured to the side of the main framework 26 and limits the outward rotational movement of the lever 32 and the curved arm 38 for purposes hereinafter discussed.

The upper stretch arm assembly 31 includes a curved arm 44 having a similar plurality of edge notches 45 in the undersurface and a lower clamping strip 46. The strip 46 is secured to the outer end of a pivot lever 47 which in turn is pivotally supported on the shaft 27 by a hub 48.

The hubs 33 and 48 extend axially of the pivot levers, as shown in FIG. 10, to align the pivot levers and therefore the plate 35 and arm 38 for pivotal movement in a corresponding plane. A plate 49, similar to plate 43, is secured to the frame to limit the outward pivotal movement of the lever 47. Plate 49 is pivotally secured to the framework 26, as most clearly shown in FIG. 14, to permit movement of the lever 47 beyond the stop position during assembly of the unformed coil group 18 to the assembly 28.

The strip 46 and outer arm 44 are similarly curved with the inner radius of the strip 46 corresponding to the outer radius of the strip 35 such that assembly 31 can telescope over the lower assembly 30. A clamping bolt 50 extends through the opposite or free end of the arm 44 for closing the notches 45 in the arm. Suitable clamping set screws 51 are provided aligned with each notch in the arm to permit fixing of the corresponding upper coil sides against axial movement.

The levers and attached arms are actuated and positioned through a mechanical means shown most clearly in FIG. 8 including a linkage 52 connected to an air operated cylinder unit 53.

The cylinder unit 53 is mounted below and centrally of the arm assemblies and includes a vertically reciprocating piston shaft 54. The linkage 52 couples the shaft 54 to the levers 32 and 47; the connection to lever 32 being described and corresponding elements of the linkage to lever 47 identified by corresponding primed numbers. A pivot link 55 is pivotally secured to the outer end of the piston shaft 54 by a pivot connector 56 and extends laterally beneath the lever 32 and outwardly of the framework 26. The link 55 is pivotally supported at an intermediate or central portion as at 56 by a link 57 which is pivotally secured at the opposite end to the framework.

The outer end of link 55 is pivotally connected to a vertically disposed transfer link 58. The upper end of the transfer link 58 is pivotally connected by a pin 59 to the outer end of lever 32 while the transfer link 58' to lever 47 is pivotally secured to the outer end of the lever by a releasable pin 60. This permits selective disconnection of the transfer link 58' from the lever 47 for telescoping of the curved strip 46 and arm 44 over the lower assembly 30, as shown in phantom in FIG. 8.

The cylinder unit 53 is connected to a suitable fluid operating source, not shown, by a mechanically positioned air valve 61 and an air distributor 62 which also connects the air to cylinder unit 53' for stretch arm assemblies 30' and 31'. The air distributor 62 is employed to insure equal distribution to the cylinders 53 and 53' such that similar forces are established on the pivot connecting linkages to the several arm assemblies and thereby insure corresponding similar movement.

In the initial standby position, the fluid is supplied to the lower end of the air cylinder unit 53 to position the shaft 54 upwardly in an extended position, as shown in FIG. 8. This positions the levers 32 and 47 to the expanded position, also shown in FIG. 8. The pinned connection 60 of transfer link 58' to the lever 47 is released and the arm 44 released from the strip 46. The plate 49 is pivoted downwardly from lever 47 to permit pivoting of assembly 31 from the initial partial overlapping arrangement of FIG. 8 to permit assembly of coil group 18 to the arm assembly 30. The clamping arm 38 is released from the strip 35 and the coil group 18 slipped over the strip 35 and the lower coil sides meshed with the notches 40 of the arm 38. The arm is then secured to the strip 35 by the clamping bolt 41 and the set screws 42 tightened to fix the coil sides in the notches. The lever 47 is then pivoted to move the strip 46 over the arm assembly 30 and beneath the outer coil sides of the unformed coil group 18. The clamping arm 45 is then secured to the strip 46 with coil sides in the notches 45 and the set screw 51 drawn up to fix the coil sides in the notches.

The plate 49 is returned to the raised stop position. The air valve 61 is then actuated to retract the shaft 54 to its inner limit with the transfer link 58 connected to lever 32 but with transfer link 58' still disconnected from lever 47. As a result, the pivot force is only applied to lever 32 which forces the attached arm assembly 30 and the overlapped arm assembly 31 to simultaneously pivot in a counterclockwise direction as viewed in FIG. 8. The movement of the piston shaft 54 is such as to center the overlapped arm assemblies 30 and 31 over the pivot shaft 27, as shown in FIG. 10. Transfer link 58' is then pinned to the lever 47. The air valve 61 is again actuated to extend the piston shaft 54 thereby exerting oppositely rotating forces on the levers 32 and 47 and the curved arm assemblies causing them to pivot in opposite directions from the centered position and carrying therewith the corresponding coil sides.

In so moving the outer unrestrained end extensions are allowed to deform. It has been found that during the pulling of the coil sides in opposite directions, the outer ends are formed into a compound twist at the centers thereof of a desired configuration to accurately and properly space the end turns, as shown in FIGS. 2-4 and FIG. 12.

After stretching of the coil group into the desired radial arrangement, the outer end extensions 12 are flared outwardly in accordance with the final positioning of the stator core unit, as follows.

A curved forming plate 63 is mounted to the shaft 27 and extends laterally beneath the outer end extensions 12.

The plate 63 is connected to the end of an arm 64 which in turn is pivotally secured to a support 65 on the shaft 27. Arm 64 is pivoted in longitudinal plane through the axis of the shaft 27 for movement of the plate 63 upwardly towards the ends of the coil turns. As shown in FIG. 12, a transverse protective strip 66 of a hard plastic or the like is preferably secured to the upper surface of the forming plate 63 in alignment with the expanded portion of the ends of the upper coil sides. The top face or surface of the strip 66 is inclined to establish a relatively small curved coil engaging portion 67. The outer end of arm 64 is pulled downwardly and moves the plate 63 upwardly with the portion 67 of strip 66 engaging the ends of the upper coil turns and forcing them upwardly. The opposite sides of the end turns move upwardly without firm physical engagement to the plate required. A further protective strip 68 may be secured to the plate 63 in slightly spaced relation to the strip 66 to further protect the windings against physical damage if so desired.

During the forming of the ends, a substantial deflection face may be applied to the outer free ends of the clamping arms 38 and 44. A releasable support is preferably provided on the shaft 27 for releasable securement to the overlapping ends of the assemblies 30 and 31. Referring particularly to FIGS. 9 and 11, a support is shown including mounting base 69 secured to the one hub 48. A support bar 70 is pivotally secured to the base 69 and is adapted to be positioned vertically with its upper end mating with a notch in the underside of the lower curved arm 38 of the lower shaft assembly 30. An L-shaped member 71 is pivotally attached to the bar 70 in spaced relation to the upper support edge and projects upwardly therefrom terminating in a lateral arm adapted to overlie and bear against the top side of the upper arm 44. A lateral clamp member 72 is pivotally secured to the upper portion of the member 71. The member 72 extends over arm 44 and then downwardly to hold the support against axial movement.

The pivotal interconnection of the support permits disengagement from the arms during assembly of the coil group and pivoting of the assemblies 30 and 31. After the pulling operation, the releasable supports are secured with the free ends of the arms to prevent deflection of the arms.

Further, to permit proper positioning of the coil group 18 within the pulling and forming apparatus, a vertically disposed locating plate 73 is mounted to the one end of the apparatus, as shown in FIG. 7. The locating plate 73 is secured to a shaft 74 which extends through a hub on a support arm 75 secured to and extending outwardly from shaft 27.

To indicate the proper axial location of the finished coil group within the stator core 2, the coil sides may be scribed along an outer edge of the arms 38 and 44 by any suitable sharp or pointed instrument.

The coil group is then removed from the apparatus and assembled into the core with similar preformed coil groups, as previously described.

The apparatus of this invention has been found to provide a reliable and accurate means for preforming of the coil groups for subsequent assembly in an annular core and the like.

Various modes of carrying out the invention are contemplated as being within the scope of the following claims particularly pointing out and distinctly claiming the subject matter which is regarded as the invention.

We claim:
1. In a coil forming apparatus for forming a winding including a plurality of turns with each turn having the sides in circumferentially distributed slots in the periphery of a circular core, and adjacent turns being disposed in adjacent slots, said winding being formed from an unformed coil group,
  clamping means adapted to separately support the opposite sides of said coil group at a plurality of spaced locations on each side between the ends thereof, the end extensions of said coil group being essentially unrestrained, and
  means to actuate said clamping means to move said clamping means and opposite coil sides in opposite directions on similar curved paths to spread and form the coil sides along said curved paths and draw the ends inwardly.

2. The apparatus of claim 1 having means disposed to the opposite ends of the clamping means for engaging the end extensions of the coil group and deforming the end extensions outwardly.

3. The coil forming apparatus of claim 1 wherein said clamping means includes a pair of aligned curved arm means pivotally mounted at the outer ends, said arm means being adapted to be pivoted into overlying relation to receive the coil group and into predetermined angularly, displaced relation, said arm means having openings to receive said coil sides of an unformed coil group.

4. The coil forming apparatus of claim 3 wherein said arm means includes clamping means releasably engageable with the coil sides to fix the coil sides against longitudinal movement during movement of the arm means to said angularly displaced relation.

5. The coil forming apparatus of claim 1 wherein said clamping means includes a pair of laterally spaced clamping units, said clamping units being spaced in accordance with the axial length of the core, each of said clamping units being similarly formed and including a pair of aligned curved arm means pivotally mounted at the outer ends, said arm means being adapted to be pivoted into overlying relation and into predetermined angularly displaced relation, said arm means having means to support said coil sides of an unformed coil group.

6. The coil forming apparatus of claim 1 wherein said clamping means includes a pair of similar laterally spaced clamping units and spaced in accordance with the length of the core, each of said clamping units including an inner coil side clamping arm assembly and an outer coil side clamping arm assembly,
  said inner arm assembly including a pivotally mounted lever, a curved arm secured to the lever, said curved arm having a plurality of notches one for each coil side with the notches spaced in accordance with the core slots, a curved clamping plate complementing the arm and releasably secured to the arm, said arm and plate being formed on the inner facing surfaces to securely clamp the corresponding coil sides therebetween against movement relative to said assembly,
  said outer arm assembly including a pivotally mounted lever, a second curved arm pivotally secured to the the second lever and disposed in alignment with the first arm and telescopable over the first arm by relative pivoting of the second levers, a second clamping plate complementing the second arm and releasably secured to the second arm, said second arm and plate being formed on the inner facing surfaces to securely clamp the corresponding coil sides therebetween against movement relative to said assembly, and
  power means connected to said levers to pivot the levers and thereby move said arms relative each other to form the coil group.

7. The apparatus of claim 6 having means disposed to the opposite ends of said clamping units and movable into engagement with the outer end portions of the coil group to flare the end portions outwardly.

8. The apparatus of claim 7 wherein said arm assemblies partially overlap in the operated position of the assemblies establishing the separation of the coil sides, and releasable support means for the arm assemblies to prevent distortion thereof during the flaring of the end portions.

9. The apparatus of claim 6 having similar members mounted to the oposite ends of said clamping units and beneath the outer end portions of a coil group, each of said members being movable outwardly into engagement with the corresponding extended portions of at least one of the coil sides of each turn.

10. The apparatus of claim 6 having similar members pivotally mounted to the opposite ends of the clamping units and having means engageable with the end portions of the outer coil sides after separation of said coil sides relative to each other to move them radially outwardly and establish flared ends.

11. The apparatus of claim 6 wherein said arm assembly partially overlaps in the operated position of the assemblies establishing separation of the coil sides, and the connection between the power means and said levers includes a linkage means including a releasable means between the power means and the one lever.

12. The apparatus of claim 6 wherein the power means includes a pair of fluid cylinder motors connected one each to each of the clamping units to actuate the corresponding levers, and a fluid circuit means connected to said power means and including means to establish similar forces and movements of each fluid cylinder motor.

13. The coil forming apparatus of claim 1 wherein said clamping means includes a pivot shaft and a pair of similar laterally spaced clamping units pivotally mounted on said pivot shaft, each of said clamping units including an inner coil side clamping arm assembly and an outer coil side clamping arm assembly.

said inner arm assembly including a lever pivotally mounted on the shaft, a curved arm pivotally secured to the lever and extending laterally toward the shaft, said curved arm having a plurality of notches one for each coil side with the notches spaced in accordance with the core slots, a curved clamping plate releasably secured to the arm to overlie said notches and hold the coil sides thereon, set screws in said curved arms in alignment with each notch to clamp the coil side against axial movement relative to said notch, said outer arm assembly including a lever pivotally mounted on the shaft and aligned with the lever of the inner arm assembly, a second curved arm pivotally secured to the second lever in alignment with the first arm and telescopable over the first arm by pivoting of the second lever, said second curved arm having notches to receive the opposite coil sides of the unformed coil group, a second clamping plate releasably secured to the second arm to overlie the notches thereon, set screws in the second curved arms in alignment with the corresponding notches to clamp the opposite coil sides against axial movement relative to said notches, and power means connected to said levers to pivot the levers and thereby move said arms relative each other to form the coil group.

14. The apparatus of claim 13 having means pivotally mounted on said shaft and located beneath the outer ends of a coil group and pivotal upwardly into engagement therewith to radially flare the outer ends.

15. The apparatus of claim 13 wherein said power means includes a pair of fluid operated cylinder motors, one for each of the clamping units, each motor having a shaft, a linkage means connecting the shafts to the corresponding levers, said shafts being movable between two limits, in the first of said limits the levers being in a maximum radial displacement and in the second position the levers being in a minimum radial displacement with the arm assemblies overlapped and centered over the shaft.

16. The apparatus of claim 15 wherein the cylinder motors are connected to a common operating fluid pressure source by a control valve and a fluid distribution means to insure equal application of pressure to the two motors.

References Cited

UNITED STATES PATENTS

| | | | |
|---|---|---|---|
| 893,570 | 7/1908 | Cramp | 140—92.2 |
| 1,334,704 | 3/1920 | Kubasta | 140—92.1 |
| 1,642,229 | 9/1927 | Cole | 140—92.2 |
| 1,984,721 | 12/1934 | Beitling | 140—92.2 |
| 2,094,024 | 9/1937 | Reichert | 140—92.2 |
| 2,151,034 | 3/1939 | Kauppert | 140—92.2 |
| 2,393,397 | 1/1946 | Mullarkey | 140—92.1 |
| 2,174,839 | 10/1939 | Riddle | 140—92.2 |

CHARLES W. LANHAM, *Primary Examiner.*

E. M. COMBS, *Assistant Examiner.*

U.S. Cl. X.R.

140—92.2